(12) United States Patent
Sakai (10) Patent No.: US 8,142,027 B2
(45) Date of Patent: Mar. 27, 2012

(54) ELECTRONIC DEVICE AND METHOD FOR CONTROLLING THE SAME

(75) Inventor: Yohei Sakai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 460 days.

(21) Appl. No.: 12/146,233

(22) Filed: Jun. 25, 2008

(65) Prior Publication Data

US 2009/0009729 A1 Jan. 8, 2009

(30) Foreign Application Priority Data

Jul. 4, 2007 (JP) ................................. 2007-176735

(51) Int. Cl.
*G03B 21/16* (2006.01)
*G03B 21/18* (2006.01)
*G03B 21/26* (2006.01)
*H05K 7/20* (2006.01)

(52) U.S. Cl. ............................ 353/52; 353/57; 361/688

(58) Field of Classification Search .................... 353/52, 353/57, 58, 60, 61, 119, 121, 122
See application file for complete search history.

(56) References Cited

U.S. PATENT DOCUMENTS

| | | | |
|---|---|---|---|
| 6,254,238 B1 * | 7/2001 | Takamatsu | 353/61 |
| 6,322,218 B1 | 11/2001 | Sugawara et al. | |
| 7,537,348 B2 * | 5/2009 | Horiguchi et al. | 353/52 |

FOREIGN PATENT DOCUMENTS

| | | |
|---|---|---|
| JP | 04-060533 A | 2/1992 |
| JP | 04-060534 A | 2/1992 |
| JP | 05-296463 | 11/1993 |
| JP | 07-333571 A | 12/1995 |
| JP | 08-042488 | 2/1996 |
| JP | 2000-046451 | 2/2000 |
| JP | 2000-194072 A | 7/2000 |
| JP | 2002-242878 | 8/2002 |
| JP | 2004-063993 | 2/2004 |
| JP | 2004-263989 | 9/2004 |
| JP | 2005-181412 A | 7/2005 |
| JP | 2006-091612 | 4/2006 |
| JP | 2006-145898 A | 6/2006 |
| JP | 2006-198582 | 8/2006 |
| JP | 2007-047843 | 2/2007 |
| JP | 2007-073707 | 3/2007 |
| JP | 2007-101897 | 4/2007 |

* cited by examiner

*Primary Examiner* — William C Dowling
*Assistant Examiner* — Ryan Howard
(74) *Attorney, Agent, or Firm* — AdvantEdge Law Group, LLC (57) ABSTRACT

The disclosure refers to an electronic device and methods for cooling an object within the electronic device. In one example, an electronic device includes a cooling fan for cooling an object. An air-quantity measuring device measures a quantity of cooling air sent by the cooling fan. An ambient-temperature measuring device measures an ambient temperature around the electronic device. A control unit is configured to control the electronic device. The control unit includes an object-temperature calculating section configured to calculate a temperature of the object from the measured air quantity and the measured ambient temperature. An operation control section is configured to control the cooling fan according to the calculated temperature of the object.

10 Claims, 5 Drawing Sheets

ELECTRONIC DEVICE AND METHOD FOR CONTROLLING THE SAME

CROSS-REFERENCE

The present application claims priority from Japanese Patent Application No. 2007-176735 filed on Jul. 4, 2007, which is hereby incorporated by reference in its entirety.

BACKGROUND

There is a technique for electronic devices equipped with an object to be cooled and a cooling fan for cooling the object, as referred to in Japanese Patent Publication No. JP-A-2007-73707, by controlling the operation of the cooling fan according to a temperature measured by a thermistor disposed in the vicinity of the object.

However, this technique may create certain problems. For example, if a relatively large amount of dust is adhered to an air filter attached to the intake port of the outer casing, the quantity of air that is taken to the interior through the air filter and sent to the object is decreased. This causes a large difference between the temperature of the object (the temperature of the object (a liquid crystal panel) which is increased by the irradiation of light emitted from a light source unit) and the temperature in the vicinity of the object. The rotation speed of the cooling fan is set according to the temperature in the vicinity of the object, which is lower than that of the object, even though the object has high temperature, because the technique of JP-A-2007-73707 controls the operation of the cooling fan according to the temperature in the vicinity of the object. This can lead to problems of not cooling the object appropriately.

SUMMARY

An electronic device and method for controlling an electronic device been developed in response to the current state of the art, and in particular, in response to these and other problems, needs, and demands that have not been fully or completely solved by currently available display devices. More specifically, various embodiments described in the disclosure provide an electronic device which can appropriately cool the object to be cooled and a method for controlling the same.

According to certain embodiments, there is provided an electronic device including an object to be cooled and a cooling fan for cooling the object. The electronic device includes an air-quantity measuring device that measures the quantity of cooling air sent by the cooling fan, an ambient-temperature measuring device that measures the ambient temperature around the electronic device, and a control unit that controls the electronic device. The control unit includes an object-temperature calculating section that calculates the temperature of the object from the air quantity measured by the air-quantity measuring device and the ambient temperature measured by the ambient-temperature measuring device, and an operation control section that controls the operation of the cooling fan according to the temperature of the object calculated by the object-temperature calculating section.

Since the electronic device includes the air-quantity measuring device, the ambient-temperature measuring device and the control unit having the object-temperature calculating section and the operation control section, the electronic device can control the operation of the cooling fan as described below.

The object-temperature calculating section calculates the temperature of the object (object temperature) from the quantity of cooling air sent by the cooling fan, as measured by the air-quantity measuring device (measured air quantity), and the ambient temperature around the electronic device, as measured by the ambient-temperature measuring device (measured ambient temperature) (an object-temperature calculating step).

For example, the quantity of cooling air sent by the cooling fan and the increment in the temperature of the object after a lapse of a predetermined time from the driving of the cooling fan have a correlation. Therefore, if an approximate expression indicative of the correlation is obtained in advance by experiment, the object-temperature calculating section can calculate an increment in the temperature of the object from the air quantity measured by the air-quantity measuring device using the approximate expression. The temperature of the object is also influenced by the ambient temperature around the electronic device. Therefore, the object-temperature calculating section can calculate the temperature of the object by adding the ambient temperature measured by the ambient-temperature measuring device to an increment in the temperature of the object.

The operation control section may then control the operation of the cooling fan according to the temperature of the object calculated by the object-temperature calculating section (an operation control step).

As such, even if a relatively large amount of dust is adhered to the air filter, the control unit can calculate the temperature of the object more accurately, and therefore control the cooling fan at a rotation speed corresponding to the temperature of the object. Thus, the object can be cooled appropriately.

The control unit may further include a warning-information storage unit that stores warning information for warning anomalies in the electronic device, an object-temperature determining section that compares the object temperature with a predetermined warning object temperature to determine whether the object temperature is equal to or higher than the warning object temperature, and an alarm control section. When the object-temperature determining section determines that the object temperature is equal to or higher than the warning object temperature, the alarm control section reads the warning information from the warning-information storage unit and makes an alarm section issue the warning information.

In this case, the control unit includes the warning-information storage unit, the object-temperature determining section, and the alarm control section. As such, if the object temperature rises to or higher than a warning object temperature that is set a little lower than a specification upper-limit object temperature specified for the object, message or voice warning information indicative of that the object temperature is approaching the specification upper-limit object temperature can be issued (e.g., by an image, voice or sound) to the user. This helps prevent the temperature of the object from becoming equal to or higher than the specification upper-limit object temperature and causing the electronic device to malfunction.

Furthermore, the temperature of the object can be calculated by the object-temperature calculating section with higher accuracy, as compared with known structures in the industry in which the temperature measured by the thermistor is assumed to be the temperature of the object. As such, this may eliminate the need for setting the warning object temperature for issuing warning information excessively lower according to variations in measured object temperature, thus allowing an appropriate warning object temperature to be set, and the warning information to be issued at an appropriate timing.

The warning-information storage unit may store a plurality of pieces of the warning information. Also, the control unit may further include an air-quantity determining section that compares the measured air quantity with a predetermined warning air quantity to determine whether the measured air quantity is equal to or smaller than the warning air quantity. The control unit may include an ambient-temperature determining section that compares the measured ambient temperature with a predetermined warning ambient temperature to determine whether the measured ambient temperature is equal to or higher than the warning ambient temperature. When the object-temperature determining section determines that the object temperature is equal to or higher than the warning object temperature, the alarm control section may read warning information according to the determination by the air-quantity determining section and the determination by the ambient-temperature determining section from the warning-information storage unit and cause the alarm section to issue the warning information.

In this case, the control unit includes the air-quantity determining section and the ambient-temperature determining section. When the object temperature becomes equal to or higher than the warning object temperature, the alarm control section reads warning information according to the determination by the air-quantity determining section and the determination by the ambient-temperature determining section from the plurality of pieces of warning information stored in the warning-information storage unit, and makes the alarm section issue the warning information. As such, the control unit can determine the reason(s) why the object temperature is approaching the specification upper-limit object temperature and inform the user of the warning information. For example, if the air-quantity determining section determines that the measured air quantity is equal to or lower than the warning air quantity which is set a little larger than a specification lower-limit air quantity at the clogging of the air filter, the alarm control section can read message or voice warning information indicative of that the air filter is clogged from the warning-information storage unit, and can inform the user with the warning information. As another example, if the ambient-temperature determining section determines that the measured ambient temperature is equal to or higher than the warning ambient temperature that is set a little lower than the specification upper-limit ambient temperature specified for the electronic device, the alarm control section can read message or voice warning information indicative of that the installation environment is out of specification from the warning-information storage unit, and can inform the user with the warning information.

The electronic device may be a projector including a light source unit, a light modulator that modulates the light emitted from the light source unit according to image information, and a projection system that projects the light modulated by the light modulator as an enlarged image.

This embodiment including a projector may offer many or all of the above-described advantages.

In certain embodiments, there is provided a method for controlling an electronic device including an object to be cooled and a cooling fan for cooling the object. The electronic device may include an air-quantity measuring device that measures the quantity of cooling air sent by the cooling fan, an ambient-temperature measuring device that measures the ambient temperature around the electronic device, and a control unit that controls the electronic device. The control unit executes functions including calculating the temperature of the object from the air quantity measured by the air-quantity measuring device and the ambient temperature measured by the ambient-temperature measuring device, and controlling the operation of the cooling fan according to the temperature of the object calculated.

The control method according to these embodiments is executed by the above-described electronic device and offers many or all of the same operations and advantages as those of the electronic device.

BRIEF DESCRIPTION OF THE DRAWINGS

Embodiments of the disclosure are described with reference to the accompanying drawings, wherein like numbers refer to like elements.

DESCRIPTION OF EXEMPLARY EMBODIMENT

In the following description, reference is made to the accompanying drawings which form a part hereof wherein like numerals designate like parts throughout, and in which are shown, by way of illustration, specific embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of the present disclosure may defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The meaning of "in" may include "in" and "on." The appearances of the phrases "in one embodiment" or "in an embodiment" in various places in the specification do not necessarily all refer to the same embodiment, but it may.

Structure of Projector

Figure 1:
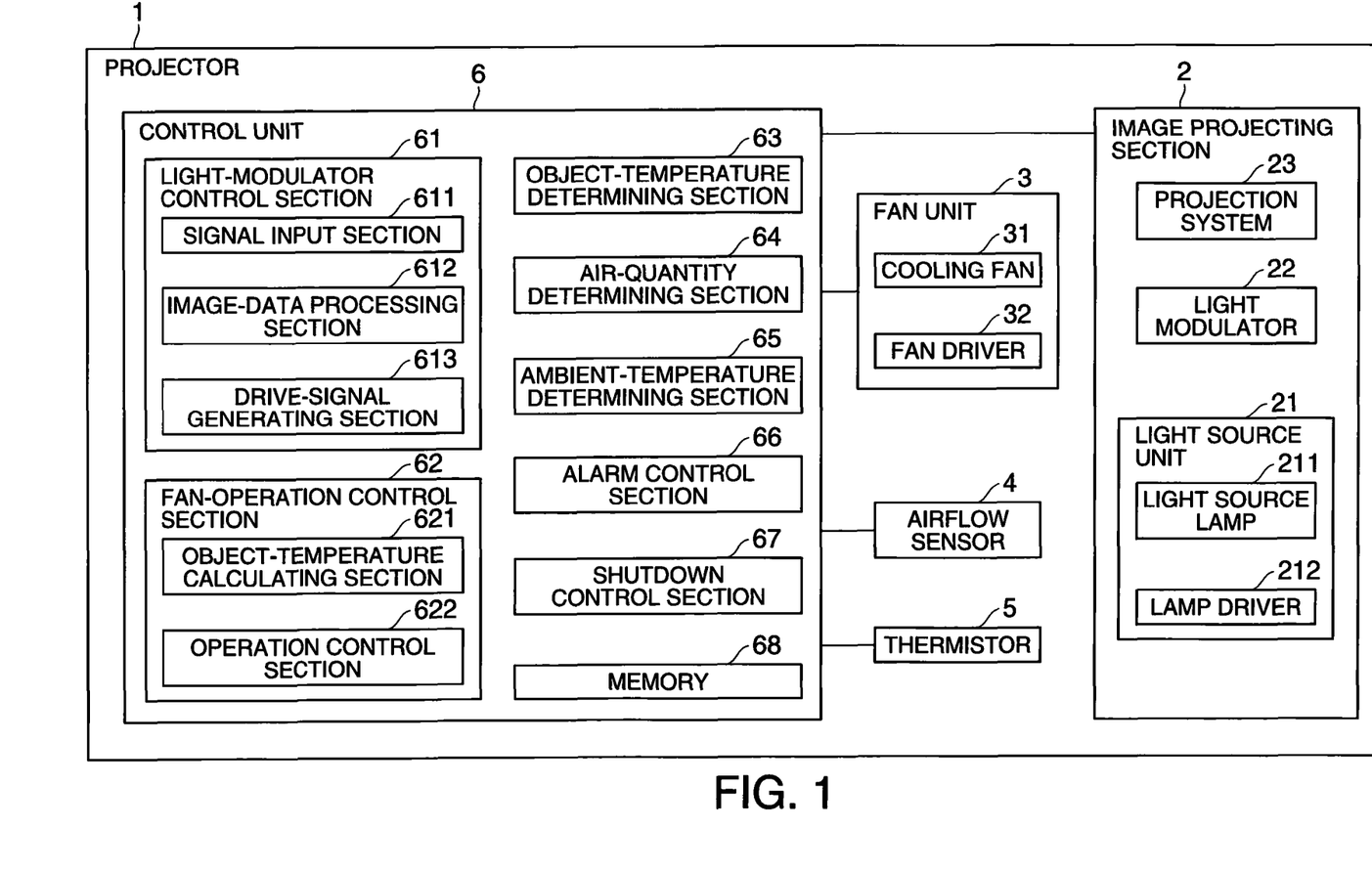
FIG. 1 is a schematic diagram illustrating the structure of a projector which is an electronic device according to at least one embodiment.

FIG. 1 is a schematic diagram showing the structure of a projector 1 corresponding to an electronic device.

The projector 1 modulates the light emitted from a light source according to image information to form image light, and projects the formed image light onto a screen (not shown) as an enlarged image. As shown in FIG. 1, the projector 1 generally includes an image projecting section 2, a fan unit 3, an airflow sensor 4 corresponding to an air-quantity measuring device, a thermistor 5 corresponding to an ambient-temperature measuring device, a control unit 6, and an outer casing 7 (see FIG. 2).

The outer casing 7 is a substantially rectangular parallelepiped casing that contains the image projecting section 2, the fan unit 3, the airflow sensor 4, the thermistor 5, the control unit 6, and so on.

The outer casing 7 has an intake port 71 (see FIG. 2) for taking in cooling air outside the projector 1 and an exhaust port (not shown) for discharging the air in the projector 1 by the fan unit 3. The intake port 71 accepts an air filter AF (see FIG. 2) for preventing the entry of external foreign matter such as dust.

The image projecting section 2 forms image light and projects the image light, on an enlarged scale, onto a screen under the control of the control unit 6. As shown in FIG. 1, the image projecting section 2 includes a light source unit 21, a light modulator 22 which is the object to be cooled, and a projection system 23.

The light source unit 21 projects light toward the light modulator 22. As shown in FIG. 1, the light source unit 21 includes a light source lamp 211 and a lamp driver 212.

The light source lamp 211 is an ultra-high pressure mercury lamp. The light source lamp 211 may not necessarily be such an ultra-high pressure mercury lamp but may be another discharge lamp such as a metal halide lamp and a xenon lamp. As another alternative, the light source lamp 211 may be a solid-state light-emitting device such as a light-emitting diode, a laser diode, an organic electro luminescence (EL) device, and a silicon light-emitting device.

The lamp driver 212 drives the light source lamp 211 under the control of the control unit 6.

The light modulator 22 modulates the light emitted from the light source lamp 211 to image light and projects the image light toward the projection system 23 according to a drive signal sent from the control unit 6.

The projection system 23 projects the image light exiting from the light modulator 22 onto the screen as an enlarged image.

Figure 2:
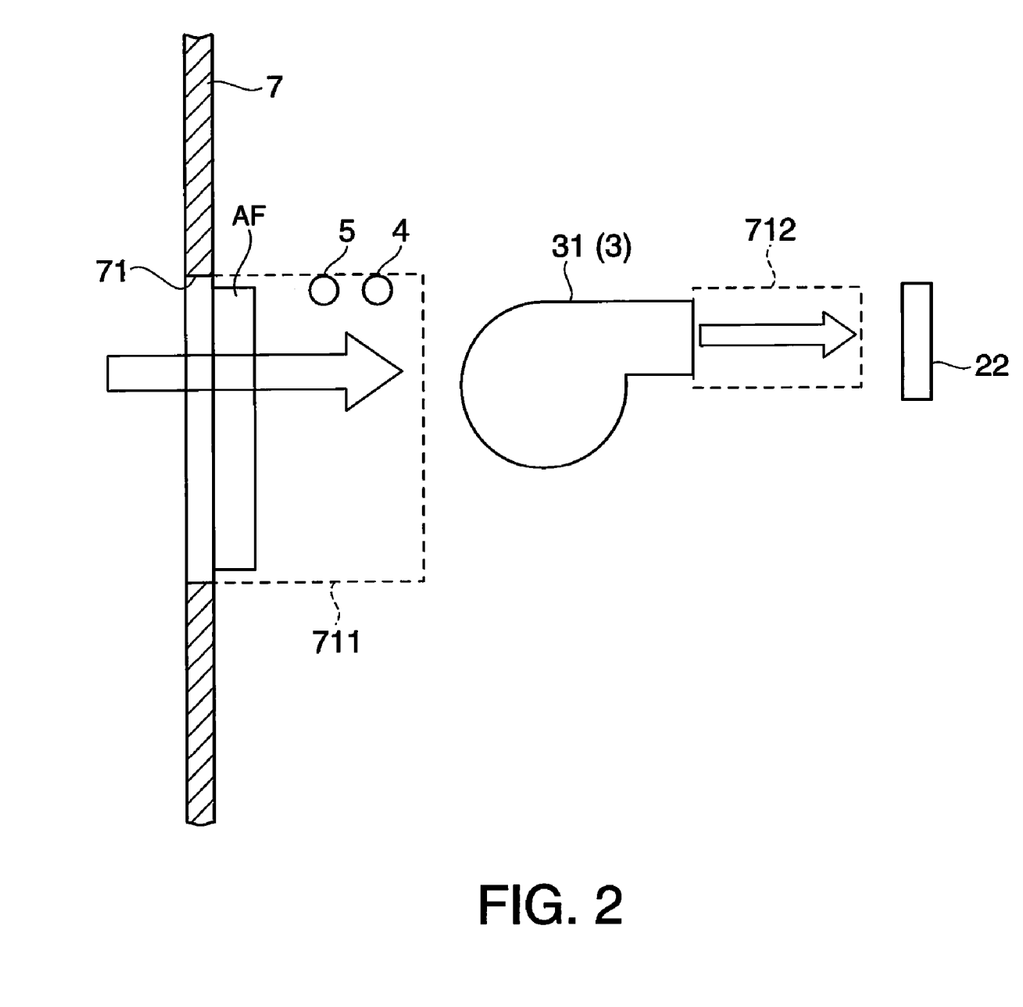
FIG. 2 is a schematic diagram of an example of the cooling structure of a fan unit and the arrangement of an airflow sensor and a thermistor according to certain embodiments.

FIG. 2 is a schematic diagram of an example of the cooling structure of the fan unit 3 and the arrangement of the airflow sensor 4 and the thermistor 5.

The fan unit 3 includes a cooling fan 31 (see FIGS. 1 and 2) and a fan driver 32 (see FIG. 1). As shown in FIG. 2, the fan unit 3 introduces cooling air outside the outer casing 7 through the intake port 71 of the outer casing 7 to cool the heat generated in the projector 1 under the control of the control unit 6. More specifically, as shown in FIG. 2, the cooling fan 31 takes in the cooling air outside the outer casing 7 through an intake-side duct 711 connected to the intake port 71, and sends the cooling air toward the light modulator 22 through a discharge-side duct 712. The light modulator 22 is thus cooled by the cooling air sent thereto.

As shown in FIG. 2, the airflow sensor 4 is mounted in the intake-side duct 711, and measures the quantity of the cooling air taken from the outside of the outer casing 7 into the intake-side duct 711 by the cooling fan 31 through the air filter AF and circulating in the intake-side duct 711. The airflow sensor 4 then outputs a signal according to the measured air quantity to the control unit 6. The structure of the airflow sensor 4 is not particularly limited; for example, an airflow sensor may be employed which forms a temperature distribution by heating a heater and measures changes in the temperature distribution depending on the quantity of air.

As shown in FIG. 2, the thermistor 5 is mounted in the intake-side duct 711, and measures the ambient temperature around the projector 1. In other words, the thermistor 5 measures the ambient temperature around the projector 1 by measuring the temperature of the cooling air taken into the intake-side duct 711 from the outside of the outer casing 7. The thermistor 5 then outputs a signal according to the measured ambient temperature to the control unit 6.

The control unit 6 includes a central processing unit (CPU), and controls the whole of the projector 1 according to a control program stored in a memory 68. The structure of the control unit 6 will be described mainly around the function of controlling the operation of the image projecting section 2 and the fan unit 3, and descriptions of the other functions will be omitted here. The control unit 6 includes a light-modulator control section 61, a fan-operation control section 62, an object-temperature determining section 63, an air-quantity determining section 64, an ambient-temperature determining section 65, an alarm control section 66, a shutdown control section 67, and the memory 68 serving as a warning-information storage unit.

The light-modulator control section 61 processes inputted image information, and outputs a drive signal according to the processed image information (image data) to the light modulator 22 to thereby make the light modulator 22 form image light. As shown in FIG. 1, the light-modulator control section 61 includes a signal input section 611, an image-data processing section 612, and a drive-signal generating section 613.

The signal input section 611 converts inputted image information (an image signal) to image information (a digital signal) that can be processed by the image-data processing section 612, and outputs it.

The image-data processing section 612 performs predetermined image data processing on the digital signal (digital image data) output from the signal input section 611. The image data processing includes, for example, a resolution converting process of matching the resolution to the resolution (number of pixels) of the light modulator 22, an image-size adjusting process, like enlargement or reduction, various image-quality control processes such as a brightness control process, a contrast control process, and a sharpness control process, an on-screen display (OSD) image generation process, such as menus and messages, a trapezoidal-distortion correction process, and a gamma correction process.

The drive-signal generating section 613 generates a drive signal for driving the light modulator 22 from the image data processed by the image-data processing section 612, and outputs the drive signal to the light modulator 22 to form an image (image light).

The fan-operation control section 62 controls the operation of the fan unit 3 according to a control program stored in the memory 68. As shown in FIG. 1, the fan-operation control section 62 includes an object-temperature calculating section 621 and an operation control section 622.

The object-temperature calculating section 621 calculates the temperature (object temperature: $T_{device}$ (° C.)) of the light modulator 22 that is the object to be cooled by the fan unit 3 from an air quantity Q (V) measured by the airflow sensor 4, an ambient temperature $T_{air}$ (° C.) measured by the thermistor 5, and object-temperature calculating information, to be described later, stored in the memory 68.

The operation control section 622 drives the cooling fan 31 with an initial voltage based on fan control information, to be described later, stored in the memory 68, and thereafter executes a feedback control to recognize object temperatures $T_{device}$ (° C.) calculated by the object-temperature calculating section 621 in sequence, calculates the deviation between the recognized object temperatures $T_{device}$ and a set temperature based on set-temperature information, to be described later, stored in the memory 68, and changes the voltage to be applied to the cooling fan 31 according to the deviation so that the object temperature $T_{device}$ of the light modulator 22 becomes the set temperature. The feedback control may be any feedback control which changes the voltage to be applied to the cooling fan 31 according to the deviation between the object temperature $T_{device}$ and the set temperature, such as a proportional control, a proportional integral (PI) control, and a proportional integral differential (PID) control.

The object-temperature determining section 63 compares the object temperature $T_{device}$ calculated by the object-temperature calculating section 621 with a warning object temperature based on warning object-temperature information, to be described later, stored in the memory 68, to determine whether the object temperature $T_{device}$ is equal to or higher than the warning object temperature. The object-temperature determining section 63 also compares the object temperature $T_{device}$ with a specification upper-limit object temperature based on specification upper-limit object-temperature information, to be described later, stored in the memory 68 to determine whether the object temperature $T_{device}$ is equal to or higher than the specification upper-limit object temperature.

The air-quantity determining section 64 compares the air quantity Q (V) measured by the airflow sensor 4 with a warning air quantity based on warning air-quantity information, to be described later, stored in the memory 68 to determine whether the measured air quantity Q is equal to or smaller than the warning air quantity. The air-quantity determining section 64 also compares the measured air quantity Q with a specification lower-limit air quantity based on specification lower-limit air quantity information, to be described later, stored in the memory 68 to determine whether the measured air quantity Q is equal to or smaller than the specification lower-limit air quantity.

The ambient-temperature determining section 65 compares the ambient temperature $T_{air}$ (° C.) measured by the thermistor 5 with a warning ambient temperature based on warning ambient-temperature information, to be described later, stored in the memory 68 to determine whether the measured ambient temperature $T_{air}$ is equal to or higher than the warning ambient temperature. The ambient-temperature determining section 65 also compares the measured ambient temperature $T_{air}$ with a specification upper-limit ambient temperature based on specification upper-limit ambient temperature information, to be described later, stored in the memory 68 to determine whether the measured ambient temperature $T_{air}$ is equal to or higher than the specification upper-limit ambient temperature.

During the feedback operation by the fan-operation control section 62, if the object-temperature determining section 63 determines that the object temperature $T_{device}$ is equal to or higher than the warning object temperature after the voltage applied to the cooling fan 31 has reached the upper limit Vmax (the upper limit of the voltage to be used by the cooling fan 31), then the alarm control section 66 reads warning information, to be described later, from the memory 68 according to the determination by the air-quantity determining section 64 and the determination by the ambient-temperature determining section 65, and outputs a predetermined control signal to the light-modulator control section 61 to make the light modulator 22 form an image based on the warning information.

Thus, the alarm section according to the embodiment corresponds to the light-modulator control section 61 and the image projecting section 2.

During the feedback operation by the fan-operation control section 62, if the object-temperature determining section 63 determines that the object temperature $T_{device}$ is equal to or higher than the specification upper-limit object temperature after the voltage applied to the cooling fan 31 has reached the upper limit Vmax, or if the air-quantity determining section 64 determines that the measured air quantity Q is smaller than the specification lower-limit air quantity, or if the ambient-temperature determining section 65 determines that the measured ambient temperature $T_{air}$ is equal to or higher than the specification upper-limit ambient temperature, then the shutdown control section 67 executes a shutdown control (a control to turn off the light source lamp 211, or a control to turn off the power source).

The memory 68 stores the control programs, information necessary for processing the components 62 to 67 and so on.

For example, the memory 68 stores, as information necessary for the feedback control of the fan-operation control section 62, object-temperature calculating information for calculating the object temperature $T_{device}$, fan-control information about the initial voltage, and set-temperature information about a temperature (set temperature) for setting the temperature of the light modulator 22 (object temperature) to a desired temperature.

In this embodiment, the object-temperature calculating information is expressed as the following Equation (1):

$$T_{device}=1/\{A\times Q^2+B\times Q+C\}+T_{air} \qquad (1)$$

Figure 3:
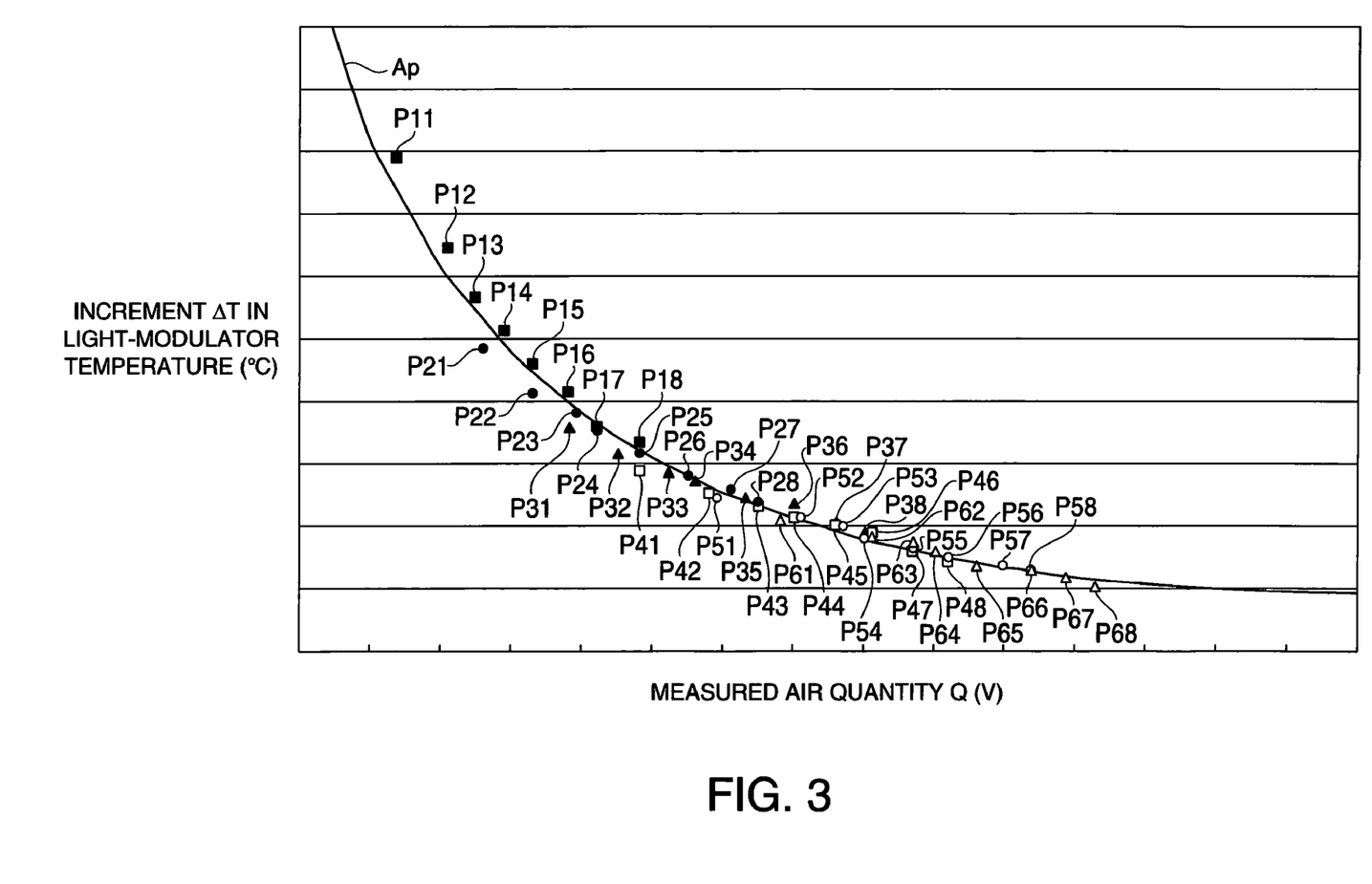
FIG. 3 is a graph for illustrating the object-temperature calculating information according to certain embodiments.

FIG. 3 is a graph for describing the object-temperature calculating information.

Equation (1) is found by experiment as described below.

Specifically, the image projecting section 2 is driven (the light source lamp 211 is lit), and the cooling fan 31 is driven by application of a predetermined voltage. A signal (measured air quantity: Q (V)) output from the airflow sensor 4 is obtained. An increment ΔT (° C.) of the temperature of the light modulator 22 after a lapse of a predetermined time from the driving of the image projecting section 2 and the cooling fan 31 is measured.

The above operation can be executed, for example, by operating a testing device, such as a personal computer, connected to the control unit 6 of the projector 1 via an interface (not shown).

The experiment uses, as the air filter AF, eight kinds of air filters AF1 to AF8 with different degrees of dust adhesion. The degrees of dust adhesion of the air filters AF1 to AF8 are set such that the air filter AF1 has the highest degree of adhesion (high degree of clogging) and the air filters AF2 to AF8 decrease in the degree in that order.

The experiment uses six kinds of voltages V1 to V6 for application to the cooling fan 31. The voltages V1 to V6 were set to increase in that order.

The results of such experiment shows a correlation between the measured air quantity Q and the increment ΔT, as shown in FIG. 3. In FIG. 3, P11 to P18 are the plots of the measured air quantity Q and the increment ΔT in the case where the lowest voltage V1 was applied to the cooling fan 31 and the air filters AF1 to AF8 were used as the air filter AF, respectively. P21 to P28, P31 to P38, P41 to P48, P51 to P58, and P61 to P68 are the plots of the measured air quantity Q and the increment ΔT in the case where voltages V2 to V8 were applied to the cooling fan 31, respectively, in contrast to P11 to P18.

Then, an approximate expression Ap (Equation (2)) is calculated by the method of least square or the like from the above 48 pieces of experiment data (the measured air quantities Q and the increments ΔT) using, for example, the foregoing testing device.

$$\Delta T=1/\{A\times Q^2+B\times Q+C\} \qquad (2)$$

where, A, B, and C in Equation (2) are constants.

Since the temperature of the light modulator 22 (object temperature $T_{device}$) is influenced by the ambient temperature around the projector 1, an expression (Equation (1)) for calculating the object temperature $T_{device}$ can be set by adding the measured ambient temperature $T_{air}$ to Equation (2).

For example, the memory 68 also stores warning object-temperature information on a temperature (warning object temperature) that is a little lower than the specification upper-limit object temperature specified for the light modulator 22 and specification upper-limit object-temperature information on a specification upper-limit object temperature, as necessary information for the determination of the object temperature $T_{device}$ by the object-temperature determining section 63.

The memory 68 further stores, for example, warning air-quantity information on an air quantity (warning air quantity) that is a little higher than the specification lower-limit air quantity (an air quantity when the cooling fan 31 is driven at the upper limit Vmax, with the air filter AF clogged) specified for the projector 1 and specification lower-limit air-quantity information on a specification lower-limit air quantity, as necessary information for the determination of the measured air quantity Q by the air-quantity determining section 64.

The memory 68 further stores, for example, warning ambient-temperature information on a temperature (a warning ambient temperature) that is a little lower than the specification upper-limit ambient temperature specified for the projector 1 and specification upper-limit ambient-temperature information on a specification upper-limit ambient temperature, as necessary information for the determination of the measured ambient temperature $T_{air}$ by the ambient-temperature determining section 65.

The memory 68 further stores, for example, a plurality of pieces of warning information for warning anomalies in the projector 1 as necessary information for the control by the alarm control section 66.

Examples of the warning information are first warning information on a message "Air filter clogged" and second warning information on a message "Installation environment out of spec".

Operation of Projector

A method for controlling the projector 1 will next be described with reference to the drawings.

Figure 4:
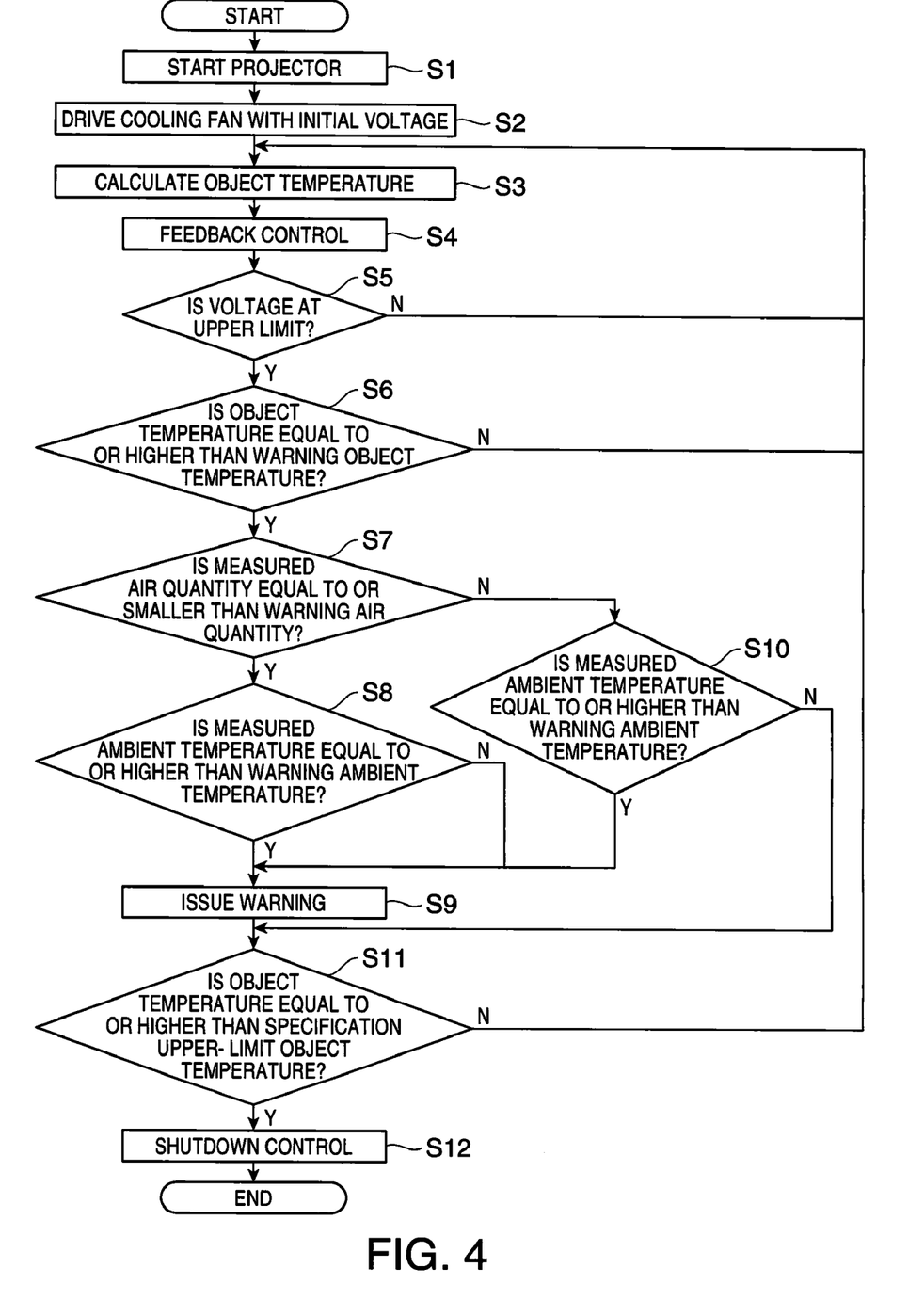
FIG. 4 is a flowchart illustrating a method for controlling the projector according to certain embodiments.

FIG. 4 is a flowchart describing the method for controlling the projector 1. While FIG. 4 illustrates exemplary steps according to certain embodiments, other embodiments may omit, add to reorder and/or modify any of the steps shown in FIG. 4.

A method for controlling the cooling fan 31 by the control unit 6 will principally be described and descriptions of those for the other components will be omitted here.

First, the operating section (not shown) of the projector 1 is operated by the user, wherein when an input operation to turn the power ON is executed, the control unit 6 starts the projector 1 (step S1).

Figure 5:
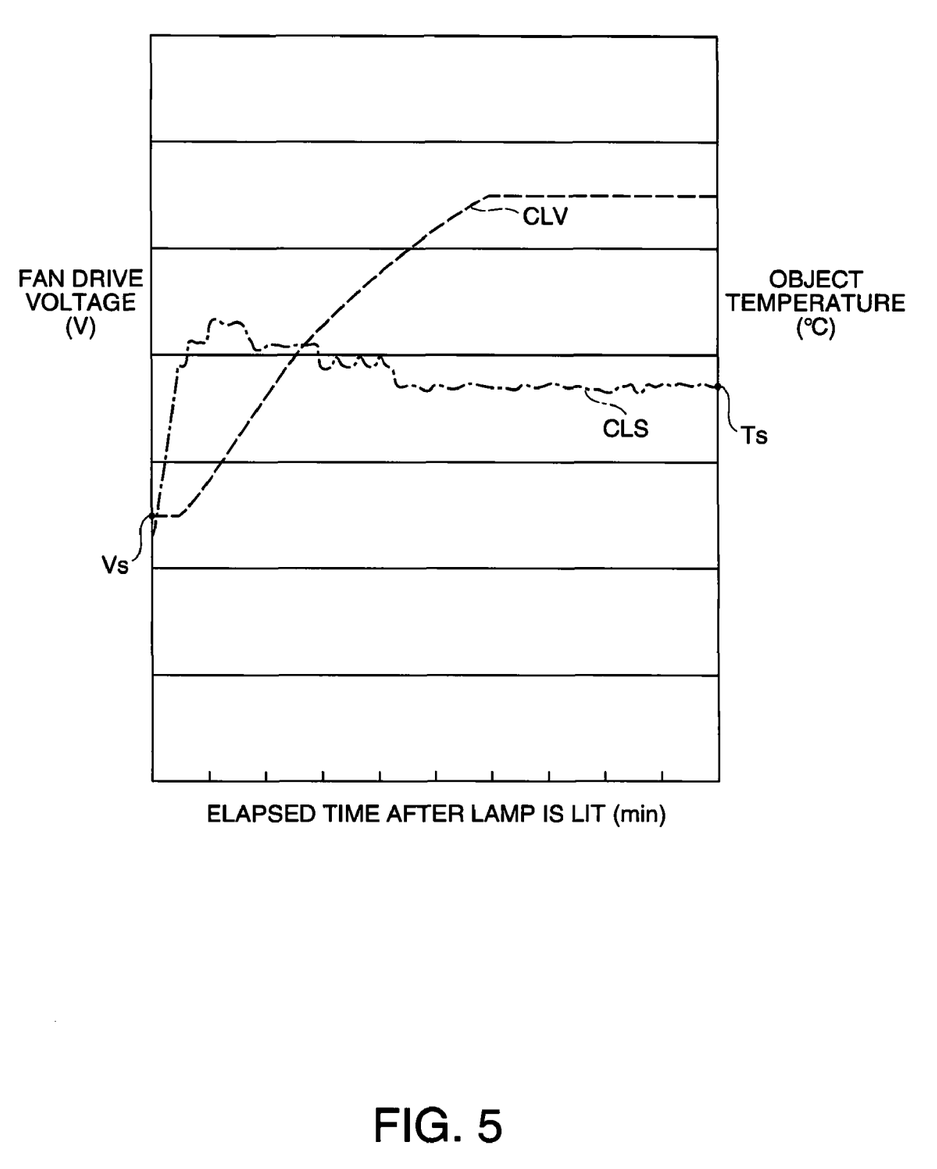
FIG. 5 is a schematic diagram showing a feedback control according to certain embodiments.

With brief reference to FIG. 5, a schematic graph of the feedback control is illustrated. FIG. 5 plots the elapsed time after the light source lamp 211 is lit (after the projector 1 is started) in abscissa and the object temperature $T_{device}$ and the voltage applied to the cooling fan 31 in ordinate. In FIG. 5, a curve CLS shows the behavior of the object temperature $T_{device}$, and a curve CLV shows the behavior of the voltage applied to the cooling fan 31.

Returning to FIG. 4, following step S1, the operation control section 622 that constitutes the fan-operation control section 62 reads the fan control information from the memory 68. The operation control section 622 then drives the cooling fan 31 with an initial voltage Vs (see FIG. 5) based on the read fan control information (step S2).

Following step S2, the object-temperature calculating section 621 that constitutes the fan-operation control section 62 reads the object-temperature calculating information (see Equation (1)) from the memory 68. The object-temperature calculating section 621 then recognizes the air quantities Q measured by the airflow sensor 4 and the ambient temperatures $T_{air}$ measured by the thermistor 5 in sequence, and calculates the object temperatures $T_{device}$ in sequence according to the measured air quantities Q and the measured ambient temperatures $T_{air}$ using Equation (1) (step S3: an object-temperature calculating step).

Following step S3, the operation control section 622 reads the set-temperature information from the memory 68. The operation control section 622 then executes the feedback control to recognize the object temperatures $T_{device}$ calculated by the object-temperature calculating section 621 in sequence, calculate the deviation between the recognized object temperatures $T_{device}$ and the set temperature Ts (see FIG. 5) based on the read set-temperature information, and change the voltage to be applied to the cooling fan 31 according to the deviation so that the temperature of the light modulator 22 (the object temperature $T_{device}$) becomes the set temperature Ts (step S4: an operation control step).

When the ambient temperature around the projector 1 is high, the temperature of air sent to the light modulator 22 is also high. This increases the rate of rise of the object temperature $T_{device}$. Also when the air filter AF is clogged, that is, when dust or the like is adhered to the air filter AF to prevent introduction of a desired quantity of air, the object temperature $T_{device}$ is increased sharply. If the operation control section 622 executes the feedback control in such cases, the voltage is increased sharply after the cooling fan 31 is driven at the initial voltage Vs, and thus, the cooling fan 31 will be finally driven at the set upper limit Vmax. When the ambient temperature is higher than the specification upper-limit ambient temperature specified for the projector 1 or when the measured air quantity Q is equal to or smaller than the specification lower-limit air quantity specified for the projector 1 because of clogging of the air filter AF, the object temperature $T_{device}$ of the light modulator 22 will exceed the specification upper-limit object temperature specified for the light modulator 22 even though the cooling fan 31 is driven at the upper limit Vmax, thus causing a malfunction in the projector 1.

Therefore, this embodiment prevents a malfunction in the projector 1 in such a manner that the alarm control section 66 discriminates the above-described cases according to the determinations of the object-temperature determining section 63, the air-quantity determining section 64, and the ambient-temperature determining section 65, and generates a message (warning information) corresponding to the respective cases to the user or by the shutdown control section 67 executing the following shutdown control.

Specifically, the alarm control section 66 determines whether the voltage applied from the operation control section 622 to the cooling fan 31 has reached the upper limit Vmax during the feedback control in step S4 (step S5).

If a negative determination (N) is made in step S5, then the control unit 6 returns to step S3, and continues the calculation of the object temperature $T_{device}$ and the feedback control.

In contrast, if a positive determination (Y) is made in step S5, then the object-temperature determining section 63 determines whether the object temperature $T_{device}$ is equal to or higher than the warning object temperature based on the warning object-temperature information stored in the memory 68 (step S6).

If a negative determination (N) is made in step S6, then the control unit 6 returns to step S3, and continues the calculation of the object temperature $T_{device}$ and the feedback control.

In contrast, if a positive determination (Y) is made in step S6, then the air-quantity determining section 64 determines whether the air quantity Q measured by the airflow sensor 4 is equal to or smaller than the warning air quantity based on the warning air-quantity information stored in the memory 68 (step S7).

If a positive determination (Y) is made in step S7, then the ambient-temperature determining section 65 determines whether the ambient temperature $T_{air}$ measured by the thermistor 5 is equal to or higher than the warning ambient temperature based on the warning ambient-temperature information stored in the memory 68 (step S8).

If a negative determination (N) is made in step S8, that is, if the measured air quantity Q is equal to or smaller than the warning air quantity and the measured ambient temperature $T_{air}$ is lower than the warning ambient temperature, then the alarm control section 66 reads the first warning information from the memory 68 and outputs a predetermined control signal to the light-modulator control section 61 to make the light modulator 22 form an image according to the first warning information (step S9). Thus, the message "Air filter clogged" is displayed on the screen.

In contrast, if a positive determination (Y) is made in step S8, that is, if the measured air quantity Q is equal to or smaller than the warning air quantity and the measured ambient temperature $T_{air}$ is equal to or higher than the warning ambient temperature, the alarm control section 66 moves to step S9, and reads the first and second warning information from the memory 68, and makes the light modulator 22 form an image according to the first and second warning information. Thus, the message "Air filter clogged" and the message "Installation environment out of spec." are displayed on the screen.

Referring back to step S7, if a negative determination (N) is made in step S7, the ambient-temperature determining section 65 executes determination on the measured ambient temperature $T_{air}$ as in step S8 (step S10).

If a positive determination (Y) is made in step S10, that is, if the measured air quantity Q is larger than the warning air quantity and the measured ambient temperature $T_{air}$ is equal to or higher than the warning ambient temperature, then the alarm control section 66 moves to step S9, reads the second warning information from the memory 68, and makes the light modulator 22 form an image according to the second warning information. Thus, the message "Installation environment out of spec." is displayed on the screen.

In contrast, if a negative determination (N) is made in step S10, that is, if the measured air quantity Q is equal to higher than the warning air quantity and the measured ambient temperature $T_{air}$ is lower than the warning ambient temperature, then the control unit 6 moves to step S11, to be described later.

Following step S9 or S10, the object-temperature determining section 63 determines whether the object temperature $T_{device}$ is equal to or higher than the specification upper-limit object temperature based on the specification upper-limit object-temperature information stored in the memory 68 (step S11).

If a negative determination (N) is made in step S11, then the control unit 6 returns to step S3, wherein it continues the calculation of the object temperature $T_{device}$ and the feedback control.

In contrast, if a positive determination (Y) is made in step S11, then the shutdown control section 67 execute the shutdown control (step S12), and the projector 1 stops formation of an image and the power is turned OFF.

Although not described above, the shutdown control section 67 may execute the shutdown control in step S12 not only when it is determined that the object temperature $T_{device}$ is equal to or higher than the specification upper-limit object temperature but also when the air-quantity determining section 64 determines that the measured air quantity Q is equal to or smaller than the specification lower-limit air quantity and when the ambient-temperature determining section 65 determines that the measured ambient temperature $T_{air}$ is equal to or higher than the specification upper-limit ambient temperature.

The foregoing embodiment may include at some of the following advantages.

In this embodiment, the projector 1 is equipped with the airflow sensor 4, the thermistor 5, and the control unit 6 including the object-temperature calculating section 621, and the operation control section 622. The control unit 6 calculates the object temperature $T_{device}$ of the light modulator 22 from the air quantity Q measured by the airflow sensor 4 and the ambient temperature $T_{air}$ measured by the thermistor 5, and controls the operation of the cooling fan 31 according to the calculated object temperature $T_{device}$. Thus, even if a relatively large amount of dust or the like is adhered to the air filter AF, the object temperature $T_{device}$ of the light modulator 22 can be calculated accurately, so that the cooling fan 31 can be driven at a rotation speed according to the object temperature $T_{device}$ of the light modulator 22. Thus, the light modulator 22 can be cooled appropriately.

The control unit 6 includes the memory 68 for storing warning information, the object-temperature determining section 63, and the alarm control section 66. Therefore, when the object temperature becomes equal to or higher than the warning object temperature, this structure allows a message indicative of that the temperature of the light modulator 22 is approaching the specification upper-limit object temperature to be displayed on the screen, thereby informing the user of it. This prevents the object temperature $T_{device}$ of the light modulator 22 from becoming equal to or higher than the specification upper-limit object temperature to cause a malfunction in the projector 1.

Furthermore, the object temperature $T_{device}$ of the light modulator 22 can be calculated by the object-temperature calculating section 621 with high accuracy, as compared with the known structure in which the temperature measured by the thermistor is assumed as the temperature of the object to be cooled. This eliminates the need for setting the warning object temperature at displaying warning information (message) on the screen excessively lower according to variations in measured object temperature, thus allowing an appropriate warning object temperature to be set, and allowing the message to be displayed on the screen at an appropriate timing.

Moreover, the control unit 6 includes the air-quantity determining section 64 and the ambient-temperature determining section 65. When the object temperature $T_{device}$ is equal to or higher than the warning object temperature, the alarm control section 66 reads warning information according to the determination by the air-quantity determining section 64 and the determination by the ambient-temperature determining section 65 from the plurality of pieces of warning information stored in the memory 68, and displays the warning information (a message) on the screen. Thus, the control unit 6 determines the reason why the object temperature $T_{device}$ of the light modulator 22 is approaching the specification upper-limit object temperature and informs the user of the fact that it is caused by the clogging of the air filter AF or the installation environment being out of spec.

Although certain embodiments have been illustrated and described herein for purposes of description, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

For example, while in previously described embodiments the object to be cooled is the light modulator 22, another component, for example, the light source lamp 211 may be the object.

The structure and arrangement of the air-quantity measuring device and the ambient-temperature measuring device are not limited to those of the above embodiments, and another structure and arrangement may be employed.

For example, the air-quantity measuring device may include a heater, an ambient-temperature sensor, and a control unit for controlling them. The control unit may control the temperature of the heater in such a manner that it has a constant temperature difference from the ambient temperature measured by the ambient-temperature sensor. When the temperature difference comes out of a fixed value by blown air, the control unit may control the heater so that the temperature difference is returned to the fixed value. At that time, the quantity of heat taken from the heater has a correlation to the quantity of blown air. Therefore, the quantity of blown air is calculated from the heating electric energy applied to the heater.

For example, the air-quantity measuring device may not necessarily be disposed in the intake-side duct 711; it may be disposed in the discharge-side duct 712 or in the vicinity of the light modulator 22 provided that it allows measurement of the quantity of cooling air sent by the cooling fan 31. Similarly, the ambient-temperature measuring device may not necessarily be disposed in the intake-side duct 711; it may be disposed outside the outer casing 7 provided that it allows measurement of the ambient temperature around the projector 1.

In the foregoing embodiments, the operation control section 622 executes a feedback control when controlling the operation of the cooling fan 31; however, the operation control section 622 may execute another operation control, for example, the following temperature-dependent control.

For example, voltage-temperature-associated information is stored in the memory 68 as fan control information, in which temperature information and voltage information for operating the cooling fan 31 at a rotation speed corresponding to the temperature are associated with each other. The operation control section 622 recognizes the object temperatures $T_{device}$ calculated by the object-temperature calculating section 621 in sequence, and executes a temperature-dependent control to operate the cooling fan 31 with a voltage according to the object temperatures $T_{device}$ on the basis of the recognized object temperatures $T_{device}$ and the voltage-temperature-associated information.

In the above-described embodiments, the light-modulator control section 61 and the image projecting section 2 are employed as the alarm section, and the alarm control section 66 controls the alarm section to display warning information (a message) on the screen; however, it is to be understood that the disclosure is not limited to such.

For example, a voice output section may be used as the alarm section, and the alarm control section may control the alarm section to output warning information by voice.

As another alternative, a light-emitting device such as a light-emitting diode (LED) may be used as the alarm section. The alarm control section controls the alarm section so that the light-emitting device emits light to generate warning information.

In this embodiment, the method for controlling the projector 1 may not necessarily be the flow of the embodiment shown in FIG. 4; the procedure may be changed as appropriate.

The light modulator 22 of the embodiment may be a transmissive liquid crystal panel, a reflective liquid crystal panel, or a micromirror device.

While the embodiments employ the front projector 1 that projects images from the screen viewing direction by way of example, the disclosure may also be applied to a rear projector that projects images from the direction opposite to the screen viewing direction.

While the embodiments employ a projector as an electronic device, the electronic device is not limited to that; other embodiments may employ another electronic device, like a personal computer, equipped with the object to be cooled and a cooling fan.

The electronic device according to certain embodiments can be used as a projector for use in presentation and home theaters because it can appropriately cool the object to be cooled.

What is claimed is:
1. An electronic device comprising:
an outer casing;
an object disposed within the outer casing;
an intake-side duct connected to an intake port defined in the outer casing;
a cooling fan for cooling the object;
an air-quantity measuring device disposed in the intake-side duct of the electronic device near an air filter, the air-quantity measuring device measuring a quantity of cooling air taken into the intake-side duct through the air filter;
an ambient-temperature measuring device that measures an ambient temperature around the electronic device, the ambient-temperature measuring device being disposed in the intake-side duct or outside the outer casing; and
a control unit configured to control the electronic device, comprising:
an object-temperature calculating section configured to calculate:
an increment in a temperature of the object from the air quantity measured by the air-quantity measuring device, and
the temperature of the object by adding the ambient temperature measured by the ambient-temperature measuring device to the increment in the temperature of the object, and
an operation control section configured to control the cooling fan according to the calculated temperature of the object.
2. The electronic device according to claim 1, wherein the control unit further comprises:
a warning-information storage unit configured to store warning information for anomalies that occur in the electronic device;

an object-temperature determining section configured to compare the object temperature with a predetermined warning object temperature and determine whether the object temperature is equal to or higher than the warning object temperature;

an alarm section; and an alarm control section configured to read the warning information from the warning-information storage unit and cause the alarm section to issue the warning information when a determination is made that the object temperature is equal to or higher than the warning object temperature.

3. The electronic device according to claim 2, wherein the warning-information storage unit stores a plurality of pieces of the warning information; and the control unit further comprises an air-quantity determining section configured to compare the measured air quantity with a predetermined warning air quantity and determine whether the measured air quantity is equal to or smaller than the warning air quantity, an ambient-temperature determining section configured to compare the measured ambient temperature with a predetermined warning ambient temperature and determine whether the measured ambient temperature is equal to or higher than the warning ambient temperature, and when the object-temperature determining section determines that the object temperature is equal to or higher than the warning object temperature, the alarm control section reads the warning information according to the determination by the air-quantity determining section and the determination by the ambient-temperature determining section and causes the alarm section to issue the warning information.

4. The electronic device according to claim 2, wherein the object is a light modulator and the alarm section is configured to cause the light modulator to form an image based on the warning information.

5. The electronic device according to claim 1, wherein the electronic device is a projector and further comprises
a light source unit configured to emit light,
a light modulator configured to modulate the light emitted from the light source unit according to image information, and
a projection system configured to project the light modulated by the light modulator as an enlarged image; and
wherein the light modulator is the object cooled by the cooling fan.

6. The electronic device according to claim 1, wherein the object is a light modulator.

7. The electronic device according to claim 1, wherein the calculated temperature of the object is determined using the relationship $$1/\{A \times Q^2 + B \times Q + C\} + T_{air},$$

wherein Q is the quantity of cooling air, $T_{air}$ is the ambient temperature and A, B, and C are constants.

8. The electronic device according to claim 1, wherein the calculated temperature of the object is further calculated using object-temperature calculating information stored in the electronic device.

9. A method for controlling an electronic device, wherein the electronic device comprises:
an outer casing;
an object disposed within the outer casing;
an intake-side duct connected to an intake port defined in the outer casing;
a cooling fan for cooling the object;
an air-quantity measuring device disposed in the intake-side duct of the electronic device near an air filter, the air-quantity measuring device measuring a quantity of cooling air taken into the intake-side duct through the air filter;
an ambient-temperature measuring device that measures an ambient temperature around the electronic device, the ambient-temperature measuring device being disposed in the intake-side duct or outside the outer casing; and
a control unit configured to control the electronic device, wherein the control unit is configured to execute functions including:
calculating:
an increment in a temperature of the object from the air quantity measured by the air-quantity measuring device, and
the temperature of the object by adding the ambient temperature measured by the ambient-temperature measuring device to the increment in the temperature of the object; and
controlling the operation of the cooling fan according to the calculated temperature of the object.

10. A method of cooling a light modulator in a projector comprising:
driving a cooling fan to provide cooling air to the light modulator;
measuring, by an air-quantity measuring device disposed in an intake-side duct of the projector near an air filter, a quantity of the cooling air taken into the intake-side duct through the air filter;
measuring, by an ambient-temperature measuring device, an ambient temperature around the projector;
calculating an increment in a temperature of the light modulator based at least on the measured air quantity;
calculating the temperature of the light modulator by adding the measured ambient temperature to the increment in the temperature of the light modulator; and
controlling the cooling fan according to the calculated temperature of the light modulator,
wherein,
the projector includes an outer casing and the intake-side duct is connected to an intake port defined in the outer casing,
the light modulator is disposed within the outer casing, and
the ambient-temperature measuring device is disposed in the intake-side duct or outside the outer casing.

* * * * *